US012528182B2

(12) United States Patent
Jones et al.

(10) Patent No.: US 12,528,182 B2
(45) Date of Patent: Jan. 20, 2026

(54) HIGH STIFFNESS SELF LEVELING PLATFORM

(71) Applicant: UNITED STATES OF AMERICA AS REPRESENTED BY THE ADMINISTRATOR OF NASA, Washington, DC (US)

(72) Inventors: Thomas C. Jones, Williamsburg, VA (US); William R. Doggett, Poquoson, VA (US); Iok M. Wong, Poquoson, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 474 days.

(21) Appl. No.: 17/880,912

(22) Filed: Aug. 4, 2022

(65) Prior Publication Data
US 2024/0044443 A1    Feb. 8, 2024

(51) Int. Cl.
  *B25J 9/16*    (2006.01)
  *B25J 9/00*    (2006.01)
  (Continued)

(52) U.S. Cl.
  CPC .......... *B25J 9/1623* (2013.01); *B25J 9/0069* (2013.01); *B66F 7/14* (2013.01); *B66F 7/0608* (2013.01);
  (Continued)

(58) Field of Classification Search
  CPC ........ B25J 9/023; B25J 9/1623; B25J 9/0069; B25J 17/0216; B60S 9/00;
  (Continued)

(56) References Cited

U.S. PATENT DOCUMENTS 2,517,373 A * 8/1950 Ambrose ............ F16H 25/2021
                                                    318/475
4,919,382 A * 4/1990 Forman ................ F16M 11/125
                                                    248/487
(Continued)

OTHER PUBLICATIONS

"Hexapods-6-Axis Stages-6-DOF Parallel Kinematic Stewart Platforms", P.I. (Physik Instrumente), L.P. 2012, (available at http://www.hexapods.net/index.php), downloaded on Jun. 29, 2022.
"High-Precision Z Tip/Tilt Stage with Air Bearings", 2021, Moving the Nanoworld, (available at https://www.pi-usa.us/fileadmin/user_upload/pi_us/files/product_datasheets/M041_M044_Precision_Tip_Tilt_Stage.pdf), 2021, downloaded on Jun. 29, 2022.
"Motion Platform V3", Next Level Racing, 2022, (available at https://nextlevelracing.com/products/next-level-racing-motion-platform-v3/), downloaded on Jun. 29, 2022.
(Continued)

*Primary Examiner* — Tyrone V Hall, Jr.
(74) *Attorney, Agent, or Firm* — M. Bruce Harper; Trenton J. Roche; Robin W. Edwards (57) ABSTRACT

A powered base assembly includes first and second structures that are operably interconnected by at least three legs that can include electrically-powered linear actuators. Each electrically powered actuator includes a housing and a rod associated with the housing. Each rod is connected to one of the first and second structures by a swivel joint having two degrees of freedom, and each housing is connected to the other of the first and second structure by a swivel joint having one degree of freedom. The linear actuators can be actuated to thereby change at least one of an angular position of the first structure relative to the second structure and a distance of the first structure, relative to the second structure. In this way, the base assembly may be used for leveling or moving a payload placed on the first structure; the payload weight is transferred linearly through the legs to the second structure. The configuration of the legs and the second structure enable to the second structure to be placed on a surface to support the base assembly while minimizing the bending moment on the second structure.

20 Claims, 5 Drawing Sheets

(51) Int. Cl.
  *B66F 7/14*   (2006.01)
  *B66F 7/06*   (2006.01)
  *F16M 11/20*  (2006.01)
  *F16M 11/22*  (2006.01)

(52) U.S. Cl.
  CPC .......... *F16M 11/2021* (2013.01); *F16M 11/22* (2013.01)

(58) Field of Classification Search
  CPC .......... B60S 9/02–12; B66F 3/08; B66F 3/16; B66F 3/18; B66F 3/20; B66F 7/06; B66F 7/0608; B66F 7/0633; B66F 7/08; B66F 7/085; B66F 7/10; B66F 7/14; B66F 7/22; G05B 2219/49257; G05B 2219/50162
  See application file for complete search history.

(56) References Cited

U.S. PATENT DOCUMENTS

| | | | | |
|---|---|---|---|---|
| 5,987,726 | A * | 11/1999 | Akeel | B25J 17/0216 29/709 |
| 6,041,500 | A * | 3/2000 | Terpstra | B23P 15/006 29/889.22 |
| 9,479,040 | B2 | 10/2016 | Schäffel et al. | |
| 9,694,455 | B2 * | 7/2017 | Brown | B23Q 1/4809 |
| 10,461,612 | B2 | 10/2019 | Glöss | |
| 10,598,211 | B2 * | 3/2020 | Simpson | F16C 11/045 |
| 10,608,517 | B2 | 3/2020 | Glöss | |
| 2013/0278098 | A1 * | 10/2013 | Bourqui | H02K 7/06 310/156.01 |
| 2014/0111133 | A1 * | 4/2014 | Pettey | H02K 7/06 310/68 B |

OTHER PUBLICATIONS

"3-Way Camera Leveller", Prosup Professional Camera Support, 2012, (available at https://www.prosup.com/product/3-way-camera-leveller/), downloaded on Aug. 1, 2022.

"Base Plates", XSF Xtreme Structures and Fabrication, 2022, (available at https://www.xsftruss.com/truss-base-plates/), downloaded on Aug. 1, 2022.

Ilian Bonev, "The True Origins of Parallel Robots". The Parallel Mechanisms Information Center, Jan. 24, 2003 downloaded from https://www.parallemic.org/Reviews/Review007.html.

Vicente Mata et al., "Dynamic Parameter Identification for Parallel Manipulators", Parallel Manipulators, Towards New Applications, edited by Huapeng Wu, Apr. 1, 2008, pp. 22-42, I-Tech Education Publishing, Vienna, Austria.

Jinsong Wang, Xin-Jun Liu, "Analysis of a novel cylindrical 3-DoF parallel robot", Robotics and Autonomous Systems 42 (2003) 31-46.

Ilian A. Bonev, "Direct Kinematics of Zero-Torsion Parallel Mechanisms" Conference Paper in Proceedings—IEEE International Conference on Robotics and Automation—Jun. 2008.

"Warner B-Track | Electric Linear Actuator", https://dpbrowntech.com/products/Thomson_Linear/B_Track.php, accessed Jan. 7, 2025. description and details of a B-Track Series Heavy Duty Electric Actuator.

Cory Peterson, "The Complete Guide to Light Pole Installation | LED Lighting Supply", https://www.ledlightingsupply.com/blog/the-complete-guide-to-light-pole-installation, accessed Jan. 7, 2025, published Oct. 21, 2022, blog entry on light pole installation.

Bhaskar Dasgupta, T.S. Mruthyunjaya, "The Stewart platform manipulator: a review", Mechanism and Machine Theory 35 (2000) 15-40.

* cited by examiner

HIGH STIFFNESS SELF LEVELING PLATFORM

STATEMENT REGARDING FEDERALLY SPONSORED RESEARCH OR DEVELOPMENT

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND OF THE INVENTION

Various types of adjustable powered supports have been developed. Leveling devices may be used in various industries and applications such as construction, photography, scientific research, and aerospace. Many devices are manually operated and directed to fine control in lighter weight applications. Some automated leveling systems may be used for robotic applications, such as deployed solar arrays and the like; however, these may often still be configured for lower weight applications and might be back driven or deformed if used with greater loads. It would be desirable for a leveler to be strong, stiff, configurable, and automated while still providing a desired level of control.

BRIEF SUMMARY OF THE INVENTION

Embodiments of the present approach may include a powered leveling base for positioning a payload structure relative to a surface. The powered leveling base may include a first plate structure adapted for receiving a payload, the first plate structure having at least three first connecting structures that are radially spaced apart about a center of the first plate structure, and a second plate structure adapted for placement on a surface, with the second plate structure having at least three second connecting structures that are radially spaced apart about a center of the second plate structure, the first plate structure and the second plate structure disposed in an opposing relationship.

At least one of the at least three first connecting structures may correspond to at least one of the at least three second connecting structures, so as to form a pair of corresponding connecting structures also disposed in opposing relationship, like the first and second structures. The base may include at least three electrically powered linear actuators, each having an actuator housing and a rod associated with the housing, the rod defining a rod end of the linear actuator and the housing defining a housing end of the linear actuator. Each actuator rod may extend and retract linearly relative to the associated housing when the linear actuator is actuated. In some embodiments, each linear actuator is configured such that it cannot be back driven, offering stiffness for the base. Each linear actuator may be interposed between the first plate structure and the second plate structure, so that the rod end is proximate to one plate structure and the housing end is proximate to the other plate structure. The linear actuator may then be operably connected with one pair of corresponding connecting structures. Each rod end of an actuator is thus configured to connect to a connecting structure to form a swivel joint permitting rotation relative to the rod about exactly two axes, while each housing end is configured to connect to a connecting structure to form a rotational joint permitting rotation relative to the housing about exactly one axis.

Each linear actuator may be independently actuated to change at least one of an angular position and a distance of the first plate structure relative to the second plate structure. In this way, the base is configured such that when the second plate structure is placed on a surface and a payload structure having a payload weight is placed on the first plate structure, the payload structure may be moved to a desired position by actuation of one or more of the linear actuators, and the payload weight is transferred from the first plate structure to the linear actuators, and then linearly from the linear actuators to the second plate structure and from the second plate structure to the surface. In doing so, the second plate structure and the three second connecting structures may be configured to minimize the bending moment exerted on the second plate from the payload weight when the second plate structure is placed on the surface—providing a strong and stiff leveling base.

Approaches of the powered leveling base may include electrically powered linear actuators in the form of a jackscrew. In some cases of the powered leveling base, each rod may operably engage a drive member that is operably connected to an output shaft of an electric motor, such that actuation of the electric motor causes the rod to shift linearly relative to the housing of the jackscrew. Each rod may include at least one helical external gear, with each drive member having a driving shaft with at least one internal gear that operably engages the at least one helical external gear of each associated rod, such that rotation of the driving shaft relative to the associated rod causes the rod to shift linearly, relative to the associated housing. In some embodiments, each jackscrew can include a gear assembly operably interconnecting the electric motor to the driving shaft. In other embodiments, each electric motor may be either a servo motor or a stepper motor. In some approaches, the at least one of the first connecting structure comprises a clevis extending radially outward from the center of the first plate structure, and each swivel joint comprises a ball joint having a bushing with an opening and a spherical convex outer surface that slidably engages a concave spherical surface in an end of each rod, and a pin extending through openings in each clevis and through the opening of the bushing. Similarly, each of the at least one of the second connecting structure may include a clevis extending radially outward from the center of the second plate structure, with each rotational joint comprises a pair of bosses extending outwardly from each housing in opposite directions and rotationally engaging a clevis.

In some embodiments, the first connecting structures may be disposed at 120° angles relative to one another at equal distances from the center of the first plate structure, so as to distribute load. Second connecting structures may be disposed at 120° angles relative to one another at equal distances from the center of the second plate structure, similarly to distribute the load.

The present approach extends to embodiments of an adjustable base for positioning a payload structure relative to a surface, where the base includes a first structure adapted for receiving a payload, the first structure having at least three first connecting structures that are radially spaced apart about a center of the first structure, and a second structure adapted for placement on a surface, the second structure having at least three second connecting structures that are radially spaced apart about a center of the second structure, the first structure and the second structure disposed in an opposing relationship.

At least one of the at least three first connecting structures may correspond to at least one of the at least three second connecting structures, so as to form a pair of corresponding connecting structures disposed in similar opposing relationship. At least three legs may be operably interconnecting the first structure to the second structure.

At least two of the legs may be electrically powered linear actuators, with each actuator having an actuator housing and a rod that extends and retracts linearly relative to the housing when the linear actuator is actuated. In this way, the rod may define a rod end of the linear actuator and the housing may define a housing end of the linear actuator. Each linear actuator may be configured such that it cannot be back driven; the rod does not extend or retract relative to the actuator housing in response to a force applied to the rod. Each linear actuator is interposed between the first structure and the second structure so that the rod end is proximate to one plate structure and the housing end is proximate to the other plate structure. In this way, the linear actuator may operably connect with one pair of corresponding connecting structures.

Each rod end may be configured to connect to a connecting structure to form a swivel joint permitting rotation relative to the rod about exactly two axes, and wherein each housing end is configured to connect to a connecting structure to form a rotational joint permitting rotation relative to the housing about exactly one axis. This configuration offers a combination of strength and control, while simplifying design considerations and avoiding interference.

Each linear actuator may be independently actuated to change at least one of an angular position and a distance of the first structure relative to the second structure. The base may be configured such that when the second structure is placed on a surface or other structure and a payload structure having a payload weight is placed on the first structure, then the payload structure may be moved to a desired position by actuation of one or more of the linear actuators. In this arrangement, the payload weight is transferred from the first structure to the at least three legs, and then linearly from the at least three legs to the second structure and then from the second structure to the surface. The second structure and the at least three legs may be configured to minimize the bending moment exerted on the second structure from the payload weight when the second structure is placed on the surface, increasing the capacity of the base.

In some approaches, each rod may be connected to the first structure by a swivel joint that permits rotation of the first structure relative to each rod about at least two axes. Each actuator housing may be connected to the second structure by a rotational joint that permits rotation of the second structure relative to each actuator housing about at least one axis. Each linear actuator may be independently actuated to thereby change at least one of an angular position and a distance of the first structure relative to the second structure.

Optionally, at least one of the legs comprises a rigid link that cannot be extended or retracted. The adjustable base may optionally include at least four legs operably interconnecting the first structure to the second structure. In some cases, the at least two of the legs comprise non-extendable rigid links. The at least two of the legs may be back drivable and include a brake to selectively prevent extension and/or extension of the leg. In some approaches, the adjustable base may include at least six legs operably interconnecting the first structure to the second structure. Optionally, for some applications, the at least three of the legs may comprise electrically powered linear actuators that are not back drivable. Also optionally, the at least three of the legs may be back drivable, and include a brake that can be actuated to selectively prevent extension and/or retraction.

Some embodiments may be directed to a powered leveling base for positioning a payload structure relative to a surface. Such embodiments may include a first structure adapted for receiving a payload. The first structure may have at least three first connecting structures that are radially spaced apart about a center of the first structure. Additionally, the embodiment may include a second structure adapted for placement on a surface, the second structure having at least three second connecting structures that are radially spaced apart about a center of the second structure. The first structure and the second structure may be disposed in an opposing, operable relationship. The at least one of the at least three first connecting structures corresponds to at least one of the at least three second connecting structures, such that each two connecting structures form a pair of corresponding connecting structures disposed in opposing relationship.

At least three electrically powered linear actuators may be included, each having an actuator housing and a rod associated with the housing, the rod defining a rod end of the linear actuator and the housing defining a housing end of the linear actuator. Each rod may extend and retract linearly relative to the associated housing when the linear actuator is actuated. Each linear actuator may be configured such that it cannot be back driven, for stiffness of operation. Each linear actuator may be interposed between the first structure and the second structure so that the rod end is proximate to one structure and the housing end is proximate to the other plate structure. In this way, the linear actuator operably connects with one pair of corresponding connecting structures, with each rod end configured to connect to a connecting structure to form a swivel joint permitting rotation relative to the rod about exactly two axes, and each housing end configured to connect to a connecting structure to form a rotational joint permitting rotation relative to the housing about exactly one axis.

Each linear actuator may be independently actuated to change at least one of an angular position and a distance of the first structure relative to the second structure. The base may thus be configured such that when the second structure is placed on a surface and a payload structure having a payload weight is placed on the first structure, the payload structure may be moved to a desired position by actuation of one or more of the linear actuators, and the payload weight is transferred from the first structure to the linear actuators, and then linearly from the linear actuators to the second structure and from the second structure to the surface. The second structure and the three second connecting structures may be configured to minimize the bending moment exerted on the second structure from the payload weight when the second structure is placed on the surface.

In some application, the at least one of the first connecting structure comprises a clevis extending radially outward from the center of the first plate structure. Each swivel joint may comprise a ball joint having a bushing with an opening and a spherical convex outer surface that slidably engages a concave spherical surface in an end of each rod, and a pin extending through openings in each clevis and through the opening of the bushing. Additionally, the at least one of the second connecting structure may comprise a clevis extending radially outward from the center of the second plate structure, and each rotational joint may comprise a pair of bosses extending outwardly from each housing in opposite directions and rotationally engaging a clevis.

Optionally, the powered leveling base may include a controller in communication with a position sensor to sense the orientation of the payload structure or first structure. The controller may thus be configured or specially programmed to operate automatically to place the payload structure and the first structure in a predetermined or desired orientation relative to second structure, such as leveling.

One aspect of the present disclosure is a powered leveling base for a structure. The powered leveling base includes a first plate structure having three first connecting structures that are spaced apart about a center of the first plate structure. The powered leveling base further includes a second plate structure having three second connecting structures that are spaced apart about a center of the second plate structure. The powered leveling base further includes at least three electrically powered linear actuators, each having a housing and a rod associated with the housing, wherein each rod extends and retracts linearly relative to the associated housing when the linear actuator is actuated. Each linear actuator may be configured such that it cannot be back driven. Each rod is connected to a respective one of the first connecting structures by a swivel joint that permits rotation of the first plate structure relative to each rod about at least two axes. Each actuator housing is connected to a respective one of the second connecting structures at a rotational joint that permits rotation of the second plate structure relative to each housing about at least one axis. Each linear actuator can be independently actuated to thereby change at least one of an angular position and a distance of the first plate structure relative to the second plate structure.

Another aspect of the present disclosure is an adjustable base including first and second structures, and at least three legs operably interconnecting the first structure to the second structure. At least two of the legs comprise electrically powered linear actuators, each having a housing and a rod that extends and retracts linearly relative to the housing when the linear actuator is actuated. Each linear actuator may be configured such that the rod does not extend or retract relative to the housing in response to a force applied to the rod. Each rod may be connected to the first structure by a swivel joint that permits rotation of the first structure relative to each rod by at least two axes. Each actuator housing may be connected to the second structure by a rotational joint that permits rotation of the second structure relative to each housing about at least one axis. Each linear actuator can be independently actuated to thereby change at least one of an angular position and a distance of the first structure relative to the second structure.

Another aspect of the present disclosure is a method of adjusting a position of a first structure relative to a second structure. The method includes providing an adjustable support assembly including first and second structures that are operably interconnected by at least three legs. At least two of the legs comprise electrically powered linear actuators, each having an actuator housing and a rod associated with the housing, wherein each rod is connected to the first structure by a swivel joint, and wherein each actuator housing is connected to the second structure by a rotational joint. The method further includes determining a desired position of the first structure relative to the second structure. One or more of the linear actuators are then actuated to thereby move the first structure relative to the second structure from a first position to the desired position.

These and other features, advantages, and objects of the present invention will be further understood and appreciated by those skilled in the art by reference to the following specification, claims, and appended drawings.

DETAILED DESCRIPTION OF THE INVENTION

Figure 1:
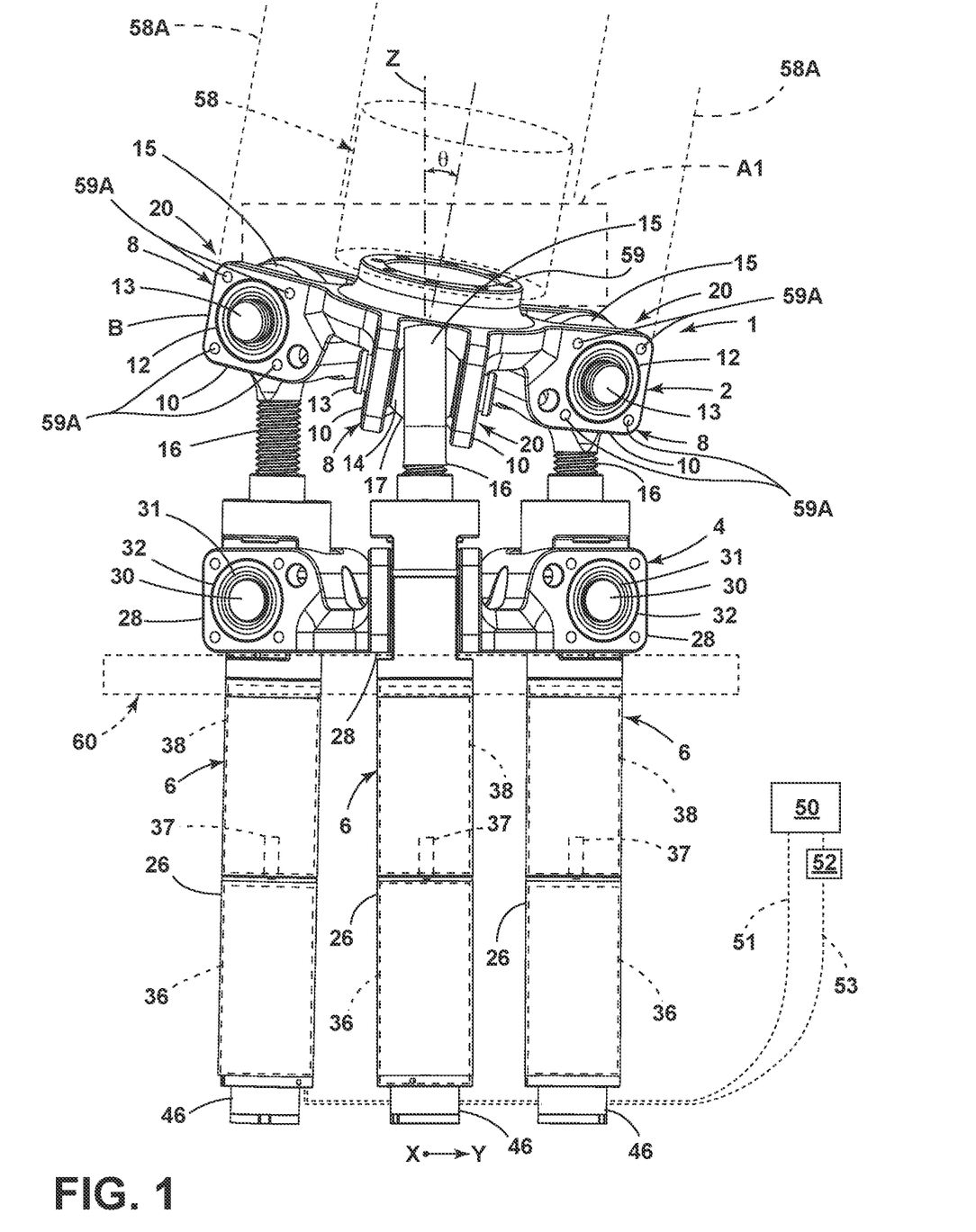
FIG. 1 is a side elevational view of a powered leveling base according to an aspect of the present disclosure.

For purposes of description herein, the terms "upper," "lower," "right," "left," "rear," "front," "vertical," "horizontal," "opposing," and derivatives thereof shall relate to embodiments of the invention as oriented in FIG. 1. However, it is to be understood that embodiments may assume various alternative orientations and step sequences, except where expressly specified by claim to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
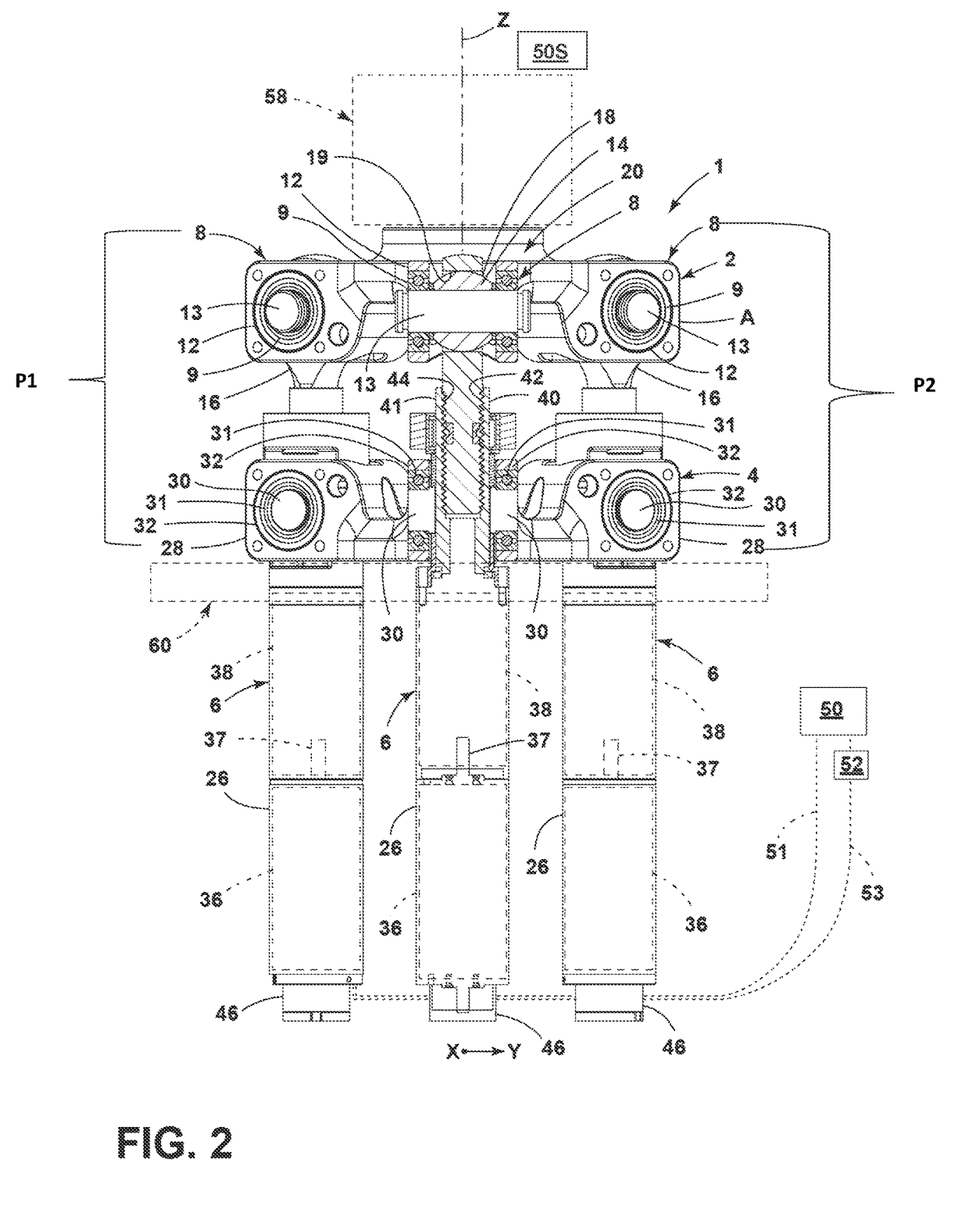
FIG. 2 is a partially fragmentary view of the powered leveling base of FIG. 1.

With reference to the embodiments shown in FIGS. 1 and 2, a powered leveling base 1 according to an aspect of the present disclosure includes a first (or upper) structure 2 that is movably interconnected in opposing relationship to a second (or lower) structure 4 by at least three interposed legs such as electrically powered linear actuators 6, for positioning a payload structure 58 relative to a surface structure 60. The structures 2 and 4 may, optionally, comprise rigid one-piece structures formed from metal (e.g., aluminum alloy) or other suitable material, and may generally comprise plate structures that are operably disposed in the somewhat opposing relative orientation as shown. As discussed in more detail below, the linear actuators 6 can be selectively actuated to linearly shift first structure 2 along a Z axis between a lowered position "A" (see FIG. 2) to an elevated position "A1" (FIG. 1) relative to second structure 4. The linear actuators 6 can also be used shift or elevate a portion of first structure 2 more than other portions, so as to tilt or rotate first structure 2 to an angled (θ from the Z axis) position "B" (FIG. 1). In this way, FIG. 1 shows some portions of first structure 2 elevated more relative to second structure 4 than other portions of first structure 2.

First structure 2, which is adapted to receive a payload, may be connected to ends of rods 16 of linear actuators 6 by swivel joints 20 having two degrees of freedom for this embodiment. Specifically, first structure 2 includes three first connecting structures 8 (see also FIG. 3) that are radially spaced apart about a center "C1" of the first structure 2. In some cases, first connecting structures 8 may be disposed so as to support first structure 2 without deformation or avoidable bending moment. The first connecting structures 8 may comprise, for example, a clevis with spaced apart arms 10 that may extend outwardly from central portion 11 of first structure 2. Openings 12 in arms 10 receive pins 13. Bearings 9 (e.g., ball bearings) may be positioned in openings 12 (FIG. 2) to rotatably support pins 13. A bushing 14 is shown disposed on each pin 13. Each linear actuator 6 includes a rod 16 having or forming an upper end 15 of the actuator 6 that defines or has an opening 17 that movably engages bushing 14 to form a swivel joint. Bushing 14 may have a convex spherical outer surface 18 that slidably engages a concave spherical surface 19 of rod end 15 to form a swivel joint 20 having two degrees of freedom. The swivel joints 20 interconnecting upper ends 15 of rods 16 to the first structure 2 may comprise a spherical joint that preferably enables continuous 360° rotation about an axis "X1" with more limited rotation about the other two axes that are perpendicular to axis "X1." For example, the swivel joints 20 may provide rotation to an angle $\theta$ (FIG. 1) of about 15-20° when first structure 2 is rotated (tilted) relative to second structure 4. However, it will be understood that the permissible (allowable) rotation angle $\theta$ may be larger or smaller, depending on the specific design of the components utilized to form the swivel joints 20 for the intended application. Swivel joints 20 may be spaced at equal radial distances "R1" (FIG. 3) from center C1 of first structure 2, and may also be spaced at equal angles "γ1" about center C1 of structure 2. However, each dimension R1 and each angle γ1 may have a different magnitude.

Figure 4:
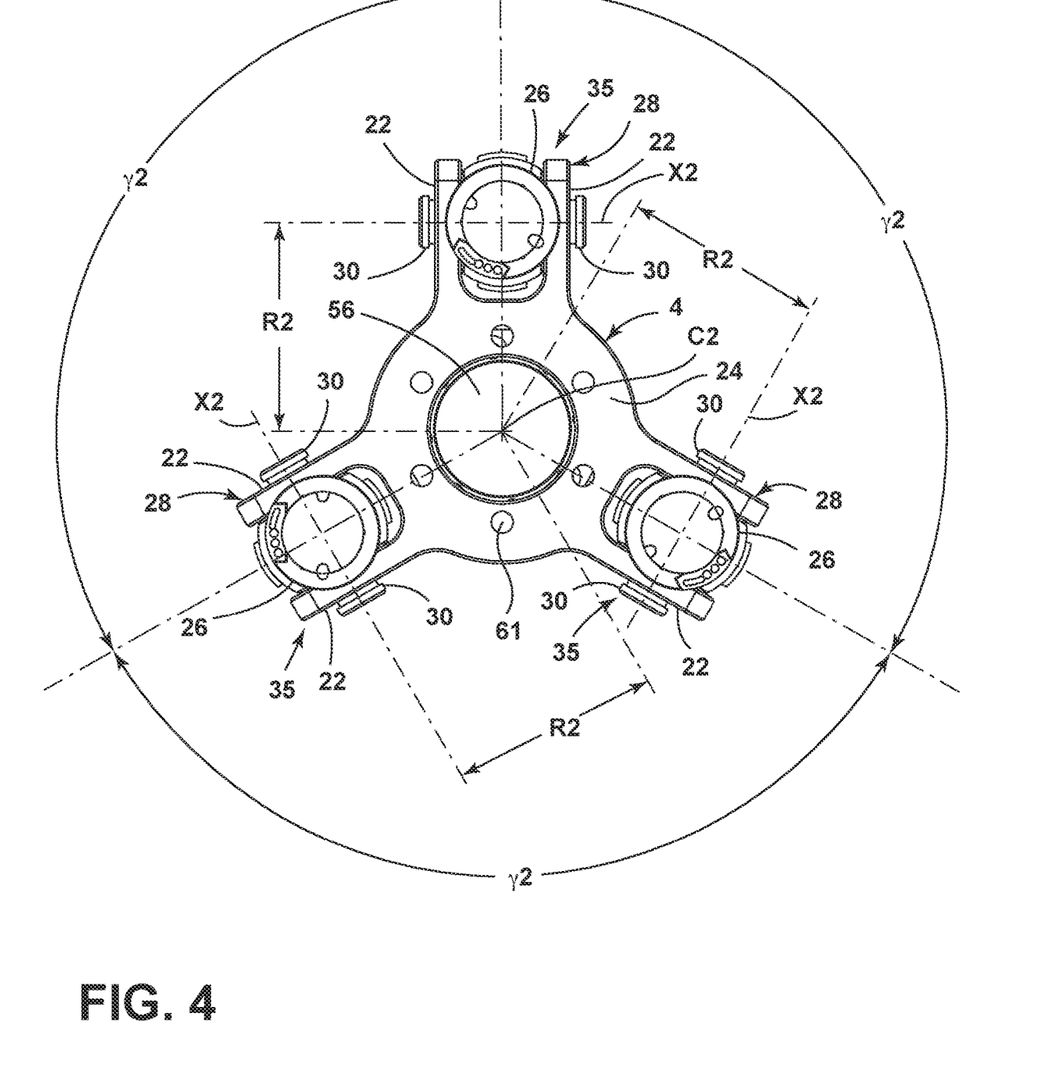
FIG. 4 is a bottom plan view of the powered leveling base of FIG. 1.

Second structure 4, which is adapted for placement on a surface or other structure, may be connected to or integrated with housings 26 of actuator 6 by pivot joints 35 having a single degree of freedom, namely pivoting of actuator housings 26 relative to second structure 4 about axis "X2" (FIG. 4), for this example. Specifically, second structure 4 includes three second connecting structures 28 (see also FIG. 4) that are radially spaced apart about a center "C2" of the second structure 4. Second connecting structures 28 may be disposed to minimize the bending moment on second structure 4. Second connecting structures 28 may comprise a clevis having a pair of spaced apart arms 22 that extend radially outward from a central portion 24 of second structure 4. Second connecting structures 28 and first connecting structures 8 generally are configured to correspond relative to each other so as to support free operation of linear actuator 6 in an interposing relationship between first structure 2 and second structure 4. As shown (FIG. 2), the visible connecting structures 8, 28 are provided in distributed, opposing, and corresponding pairs P1, P2 comprising a first connecting structure 8 corresponding operably and a second connecting structure 28. (This embodiment might contemplate a third pair P3, not shown.) Note that because the connecting structures may be similar, in other embodiments, the orientation of one or more actuators 6 may be reversed or mixed from the orientation shown in these figures. Each linear actuator 6 includes or defines a housing 26 at one end, and each actuator housing 26 may include a pair of bosses 30 extending in opposite directions. Bosses 30 rotatably engage bearings 31, and bearings 31 are received in openings 32 through arms 22. In this way, the second structure 4 may be movably interconnected with actuators 6 by pivot joints 35. The pivot joints 35 comprise rotational joints that permit rotation of the second structure 4 relative to each actuator 6 about exactly one axis "X2" (FIG. 4). Pivot joints 35 thus preferably provide a single degree of freedom (e.g. rotation about axis "X2"); in general, additional degrees of freedom at pivot joints 35 would introduce complications in movement and control.

Pivot joints 35 may be spaced at equal radial distances "R2" (FIG. 4) from center C2 of second structure 4, and may also be spaced at equal angles "γ2" about center C2 of second structure 4. However, each dimension 22 may have a different magnitude, and each angle γ2 may have a different magnitude. R1 may, optionally, be equal to R2. However, this is not required. All angles γ1 and γ2 may be equal (i.e., about 120°), but this also is not required. Configuration of second connecting structures 28 relative to second plate structure 4 may minimize the bending moment exerted on the second plate structure 4 when the first plate structure 2 is loaded with a payload structure 58. Such configuration will depend in part on the application and the nature of surface structure 60. However, cantilevered support for second plate structure 4, when loaded with payload weight, may tend to increase the bending moment, and thereby decrease the overall capacity. Of course, applications offering a flat surface structure 60 and supporting a flat second plate structure 4 may increase the supported surface area.

"Corresponding" in reference to the pairs P1, P2 (both shown), P3 (not shown) . . . Pn of first and second connecting structures 8, 28 (FIG. 2) means that they connect to and support linear actuators 6 while the actuators are interposed between first structure 2 and second structure 4 (i.e., which are in relative opposing relationship), and that the opposing pairs P1, P2 of first and second connecting structures 8, 28 are configured to allow for the movement or actuation of linear actuator 6 to move, level, or adjust a payload structure 58 to a desired position, without creating mechanical interference of linear actuators 6 with any other structure during such operation. In addition, as noted above, first and second connecting structures 8, 28 may be embodied similarly, such that any single connecting structure may connect with or engage either end of linear actuator 6. Because of this, embodiments may vary in the orientation of linear actuator 6 from the embodiment shown, as noted further below.

Referring again to the embodiment shown in FIG. 2, each linear actuator 6 may include an electric motor 36 with a rotating output shaft 37 that operably engages a gear assembly 38. Each gear assembly 38 is operably connected to a driven shaft 40 having internal gears or threads 42 that engage external gears or threads 44 of each rod 16 such that actuation of electric motor 36 causes the rotation of driven shaft 40 relative to rod 16 which, in turn, causes the rod 16 to extend and retract linearly relative to housing 26. Thus, rod 16 defines a rod end of linear actuator 6 and housing 26 defines a housing end of linear actuator 6. The linear actuators 6 include threads or gears 42 and 44 and may be referred to herein as jackscrews. However, it will be understood that other types of linear actuators or jackscrews may also be utilized. Optionally, electric motor 36 may be integrated into or comprise a portion of housing 26.

The embodiments of FIGS. 1 and 2 show rod 16 connecting via rod end of linear actuator 6 to first connecting structure 8 of a first (or upper) structure 2, and housing 26 is connecting via housing end of linear actuator 6 to second connecting structure 28 of second (or lower) structure 4. This "upper" and "lower" arrangement or orientation of linear actuator 6 may be reversed for one or all of the linear actuators 6, so long as the connecting structures are mechanically similar, as shown. Thus, generically a linear actuator 6 operably connects with one pair (e.g., P1 or P2, etc.) of corresponding connecting structures (i.e., such pair having a first connecting structure 8 and a second connecting structure 28). In other words, for embodiments having a first structure 2 in an upper orientation and second structure 4 in a lower orientation (and three legs), linear actuator 6 may be oriented with the rod end "up" for three, two, one, or none of the three linear actuators 6 positions shown. The remaining linear actuator 6 positions could then be oriented housing end "up." The vertical configuration of actuators 6 will depend on the needs of the application. Generically, however, each linear actuator 6 operably connects with one pair (e.g., P1 or P2 or Pn) of corresponding connecting structures, where such pair has one first connecting structure 8 and one second connecting structure 28 disposed in opposing relationship.

Figure 3:
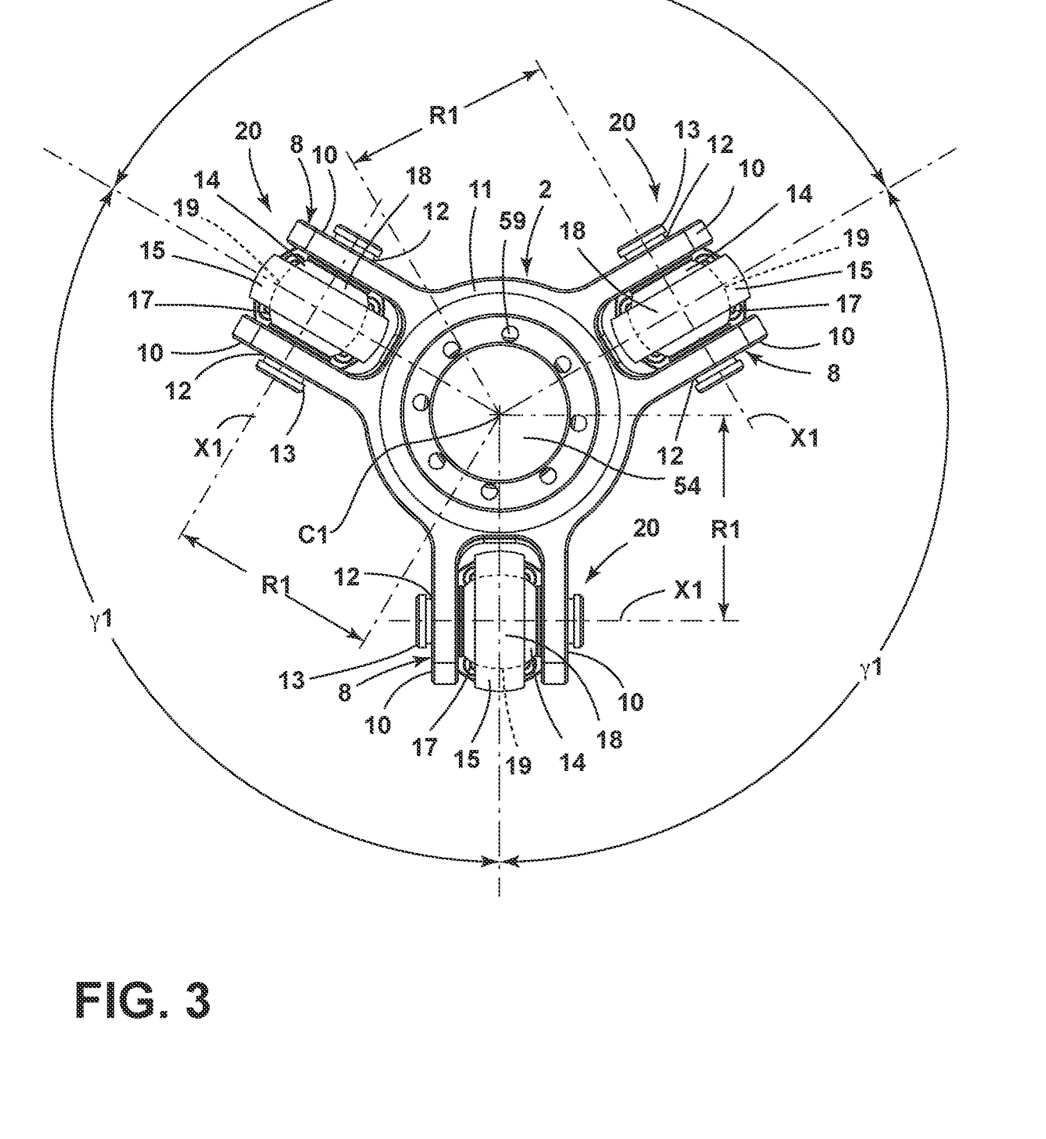
FIG. 3 is a top plan view of the powered leveling base of FIG. 1.

Each gear assembly 38 of a linear actuator 6 may be configured to reduce the rotational rate of driven shaft 40 relative to the rotational rate of each output shaft 37 of each electric motor 36. It will be understood that gear assemblies 38 may be configured to provide a suitable gear reduction ratio as required for or as may be desired in a particular application. Also, gear assemblies 38 are not necessarily required. Electric motors 36 may comprise, for example, servo motors or stepper motors that may be operably connected to rotational encoders 46, whereby the rotational position of the electric motors 36 can be supplied to a controller 50 via lines 51 or other suitable arrangement. Electric motors 36 may also be operably connected to an electrical power supply 52 by conductive lines 53 or the like. Controller 50 and/or power supply 52 may be mounted to one of structures 58 or 60, or other structure associated with base 1. With reference to FIGS. 3 and 4, first structure 2 may include an enlarged central opening 54, and second structure 4 may include an enlarged central opening 56. Lines 51 and 53 and/or other lines may be routed through one or both openings 54 and 56 if required.

Referring again to the embodiments of FIG. 2, powered leveling base 1 may be used to adjust a position of a payload structure 58 relative to a surface structure 60. Specifically, payload or structure 58 may be secured to first structure 2 using threaded fasteners that are received in threaded openings 59 (FIG. 3), and surface or structure 60 may be secured to second structure 4 using threaded fasteners that are received in threaded openings 61 (FIG. 4). Structure 58 may include portions 58A that are secured to first (upper) plate structure 2 using fasteners (e.g., threaded fasteners) that engage openings 59A (e.g., threaded openings) in plate structure 2. It will be understood that any suitable connecting arrangement may be used to secure a payload structure 58 and/or structures 58A to plate structure 2. Also, structures 58 and 60 may comprise virtually any structures required or appropriate for the application, and other forms of fastening or interconnecting may be used. According to an example, payload structure 58 and surface structure 60 may comprise components of a Lightweight Surface Manipulation System (LSMS) that is designed for use on a lunar surface. Base 1 may thus be configured such that when the second structure 4 is placed on a surface 60 and a payload structure 58 having a payload weight is placed on the first structure 2, the payload structure 58 may be moved to a desired position by actuation of one or more of the linear actuators 6. The payload weight is transferred from the first structure 2 to the at least three legs or linear actuators 6 (as shown), and then linearly from the at least three legs or linear actuators 6 to the second structure 4 and from the second structure to the surface 60. As introduced above, the second structure 4 and the at least three legs and second connecting structures 28 may be configured to minimize the bending moment exerted on the second structure 4 from the payload weight, when the second structure 4 is placed on the surface 60. Of course, the design of second structure 4 will be a function of the application and nature of surface 60. A substantially flat surface 60 may provide greater area for contact with second plate structure 4 for distribution of payload weight. An irregular surface 60 may justify greater thickness of or stronger material choice for second plate structure 4, including considered placement or configuration of second connecting structures 28. It is contemplated that these aspects will enable strong, stiff, and versatile embodiments not heretofore available.

In use, the electrically powered linear actuators 6 may be selectively actuated to rotate (tilt) structure 58 relative to structure 60 and/or to translate structure 58 linearly along the Z axis relative to structure 60 to a desired orientation. Thus, the term "level" is used generically to mean to move, dispose, or adjust achieve a desired orientation, with horizontal leveling on an uneven surface (i.e., surface 60, or a surface thereunder) a commonly understood application. The variety of motion available with such embodiments, and the use of powered actuators 6, enables embodiments of powered leveling bases 1 that are capable of automatic operation or self-leveling. For example, controller 50 may be configured to automatically level structure 58 and first structure 2 relative to second structure 4 and structure 60. Such an embodiment may include a controller 50 configured to interrelate and communicate with a sensor 505 (FIG. 2), such as an inertial measurement unit, gyroscope, microelectromechanical systems (MEMS) gyroscope, or other device for measuring or determining position or orientation (i.e., which may be considered as a sensor integrated with controller 50.) Sensor 505 may be disposed on first structure 2 or payload structure 58, as shown in FIG. 2, or some other desired location for the application. Such a position sensor 505 may sense the aspect, movement, position, or orientation of payload structure 58 and/or first structure 2 and provide information to controller 50 relative to second structure 4 and/or structure 60 or other reference, as desired for the application. Controller 50 may then automatically interrelate with or actuate one or more linear actuators 6 to perform a desired movement within a range of motion to achieve a desired position or orientation. Thus, embodiments of powered leveling base 1 may ultimately operate automatically with 3 degrees of freedom (DOF), with the XY rotational, and Z translational, to achieve automatic movement or self leveling. Only two actuators 6 are needed to achieve XY rotational motion to level structure 58, but a third actuator 6 may offer Z translational motion (as well as redundancy in application.) In an example of applications, structures 4 or 60 may engage a ground, lunar and/or other uneven surface, and the controller 50 may be configured to automatically actuate the linear actuators 6 as required to position (or level) structure 2 and structure 58. It will be understood that linear actuators 6 may be actuated to adjust the position of structure 58 relative to structure 60 as required for a particular application, and structure 58 may be adjusted to virtually any required position relative to structure 60. In general, each of the three actuators 6 may have three DOF. For the embodiment shown, one rotational DOF may be mounted on a pair of bearings located on the second plate structure 4 of base 1, and two rotational DOF may move about the same point on a swivel joint located on the first plate structure 2 of the base 1. These DOF allow opposing first and second plate structures 2, 4 to move freely relative to each other, while maintaining a stiff orientation connection between the two triple yokes to achieve leveling (or positioning) of the supported payload structure 58. In general, the leveling base 1 may be utilized in a wide range of end use applications including automated leveling systems, deployed solar arrays, construction applications, photography, scientific research, support of power tools, or virtually any other application that requires adjustment between two structures.

If desired for the application, the linear actuators 6 are preferably configured such that they cannot be back driven, another aspect contributing stiffness to leveling base 1. A back driven actuator (or similarly, a screw or system) means that when a force is applied to an actuator rod, the rod otherwise extends or retracts relative to the actuator housing (or rest of the actuator) in response to the type of applied force. This may happen with some actuators when unpowered, for example. Backup circuits/relays, self-locking mechanisms, nuts, gas springs, brakes, etc. may be used to prevent or reduce such devices from being back driven. In such embodiments, the linear actuators 6 do not have to be actuated in order to maintain a position of first structure 2 relative to second structure 4. In use, the angular and/or linear position of structure 58 may be adjusted relative to structure 60 by actuating linear actuators 6 to provide the desired angular position, and the actuator 6 can also be actuated to shift the first structure 2 linearly along axis Z to adjust the location of first structure 2 relative to second structure 4 along axis Z. Once the structure 58 is properly positioned relative to structure 60, linear actuators 6 can be de-actuated (e.g., electric power is no longer supplied to electric motors 36). Because the linear actuators 6 cannot be back driven, the position of structure 58 and the first structure 2 relative to the structure 60 and the second structure 4 does not change, even if forces are applied to first structure 2 and/or second structure 4.

Also, it will be understood that the linear actuators 6 may have virtually any suitable configuration that achieves the disclosed functionality and inter-operability. Linear actuators 6 may comprise, for example, jackscrews of a known type including an electric motor that drives a worm screw, which, in turn, drives a worm wheel to rotate an elongated rod having threads that engage a threaded translating nut. Also, although (in some embodiments) the linear actuators 6 preferably cannot be back driven for stiffness, the linear actuators 6 could be configured such that they may be back driven if required or if beneficial for a particular application. As noted above, if first and second connecting structures 8, 28 are similarly configured, as shown, then the legs or actuators 6 may be mounted in reverse (e.g., housing end up) and base 1 will still operate. Reverse or mixtures of orientation for actuators 6 are contemplated within the present approach (e.g., embodiments having three actuators 6 with, for example: three rod ends up, one rod end up with two rod ends down, or two rod ends up with one rod end down).

Figure 5A:
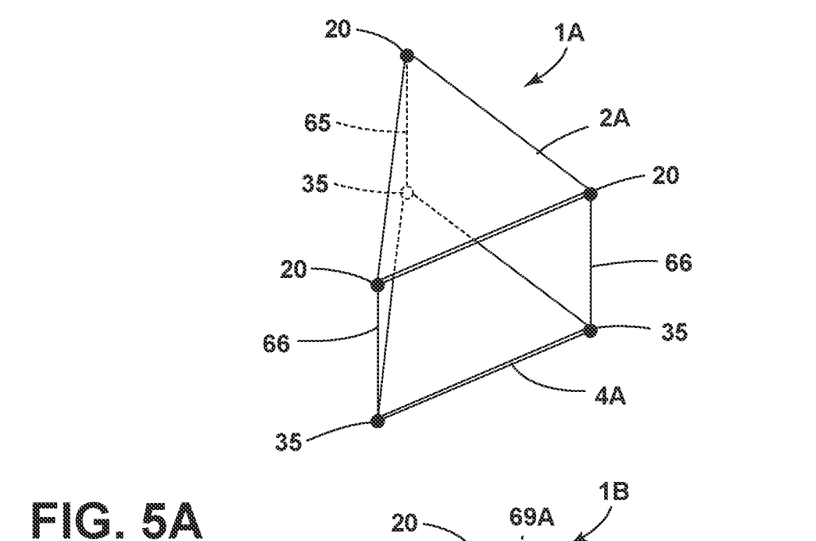
FIG. 5A is a schematic view of a leveling base according to another aspect of the present disclosure.
Figures 5B, 5C:
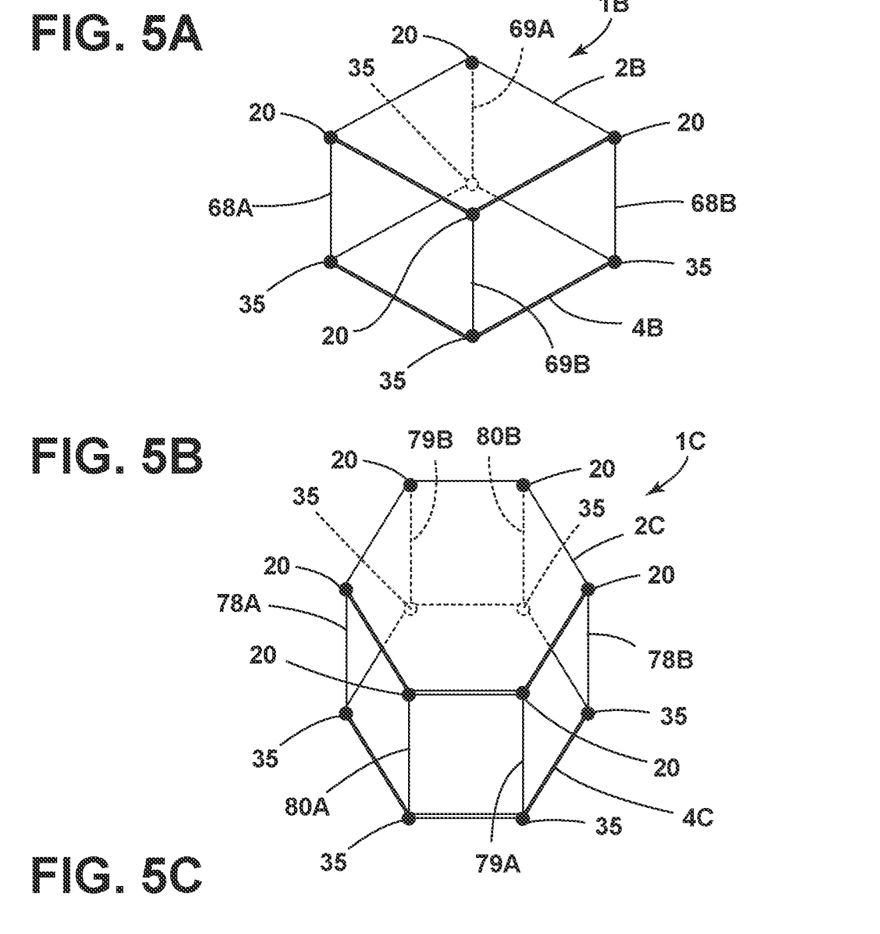
FIG. 5B is a schematic view of a leveling base according to another aspect of the present disclosure.
FIG. 5C is a schematic view of a leveling base according to another aspect of the present disclosure.

FIGS. 5A-5C are schematic views of alternative embodiments of leveling bases 1A, 1B, and 1C, respectively. Base assembly 1A (FIG. 5A) includes a first structure 2A that is interconnected with a second structure 4A by a leg 65, and a pair of legs 66. The leg 65 may comprise a rigid link that is not extendable and legs 66 may comprise linear actuators that are substantially similar to the linear actuators 6, as described in more detail above in connection with FIGS. 1-4. The legs 65 and 66 may be interconnected with structures 2A and 4A by swivel joints 20 and 35, which may have substantially the same configurations as the swivel joints 20 and 35 described above. However, the swivel joints 20 and 35 may have other configurations if required for a particular application. In use, the linear actuators 66 can be actuated to extend and retract in a manner that is substantially similar to the linear actuators 6 described in more detail above in connection with FIGS. 1-4. Because the leg 65 has a fixed length, actuation of the linear actuators 66 rotates upper structure 2A relative to the lower structure 4A. However, the first structure 2A does not translate linearly (without rotation) relative to second structure 4A.

With reference to FIG. 5B, a base assembly 1B according to another aspect of the present disclosure includes a first structure 2B that is movably interconnected with a second structure 4B by legs 69A, 69B, 68A, and 68B. Legs 68A and 68B form a first pair of legs, and legs 69A and 69B form a second pair of legs. Legs 68A and/or 69A may comprise fixed, non-extendable structures or links, or they may comprise powered actuators that are back drivable, but include a brake to prevent changes in length even if power to an electric motor of the legs 68A and/or 69A is not supplied. The legs 68B and 69B may comprise electrically powered linear actuators that are not back drivable (e.g., substantially similar to the linear actuators 6 described above). In use, the legs 68B and 69B can be actuated to extend and retract, and the brakes of legs 68A and 69A can be selectively released (unless legs 68A and 69A are rigid links) to thereby control the position and angle of first structure 2B relative to second structure 4B.

With further reference to FIG. 5C, a base assembly 1C according to another aspect of the present disclosure includes a first structure 2C that is interconnected with a second structure 4C by legs 78A, 78B, 79A, 79B, 80A, and 80B. Legs 78A and 78B form a first pair of legs, legs 79A and 79B form a second pair of legs, and legs 80A and 80B form a third pair of legs. In general, each pair includes one leg that is powered, and not back drivable (i.e., similar to linear actuators 6 described in more detail above), and one leg that is back drivable with a brake to selectively prevent extension and retraction. In operation, the legs 78A, 78B, 79A, 79B, 80A and 80B can be selectively actuated to adjust an angular and translational position of structure 2C relative to structure 4C.

The present disclosure is not limited to embodiments of aerospace applications or methods, but rather could be utilized to develop or support a wide range of applications. Examples of applications include the adaptation to moving environments, leveling, or those supporting the moving of items (e.g., robotics, manufacturing, medicine), whether for watercraft (e.g., ships, submarines), land vehicles, static placement to mount equipment requiring displacement, etc. The structures, methods, and process of the present disclosure may be utilized in connection with virtually any item or system appropriate for application of a leveling base.

What is claimed is:

1. A powered leveling base for positioning a payload structure relative to a surface, the powered leveling base comprising:
 a first plate structure adapted for receiving a payload structure, the first plate structure having at least three first connecting structures that are radially spaced apart about a center of the first plate structure;
 a second plate structure adapted for placement on a surface, the second plate structure having at least three second connecting structures that are radially spaced apart about a center of the second plate structure, the first plate structure and the second plate structure disposed in an opposing relationship, the second plate structure having a first portion and a second portion opposite the first portion;

wherein at least one of the at least three first connecting structures corresponds to at least one of the at least three second connecting structures so as to form a pair of corresponding connecting structures disposed in opposing relationship;

at least three electrically powered linear actuators, each having an actuator housing and a rod associated with the housing, the rod defining a rod end of the linear actuator and the housing defining a housing end of the linear actuator, wherein each rod extends and retracts linearly relative to the respective housing when the linear actuator is actuated, wherein each linear actuator is configured such that it cannot be back driven, and wherein all linear actuators can be actuated simultaneously whereby the rods of all linear actuators extend simultaneously or retract simultaneously to cause the first plate structure to translate linearly relative to the second plate structure;

wherein each linear actuator is partially interposed between the first plate structure and the second plate structure so that the rod end is proximate to one plate structure and the housing end is proximate to the other plate structure, wherein the linear actuator operably connects with one pair of corresponding connecting structures;

wherein each rod end is configured to connect to one of the at least three first connecting structures to form a swivel joint permitting rotation relative to the rod about exactly two axes;

wherein each housing end is configured to connect to one of the at least three second connecting structures to form a rotational joint permitting rotation relative to the housing about exactly one axis and each housing extends through its respective connected one of the at least three second connecting structures such that the housing extends from the first portion of the second plate structure and past the second portion of the second plate structure;

wherein each linear actuator can be independently actuated to thereby change at least one of an angular position and a distance of the first plate structure relative to the second plate structure;

wherein the base is configured such that when the second plate structure is placed on the surface and the payload structure having a payload weight is placed on the first plate structure, the second portion of the second plate structure at least partially contacts the surface and each housing extends at least partially into the surface, the payload structure may be moved to a desired position by actuation of one or more of the linear actuators, and the payload weight is transferred from the first plate structure to the linear actuators, and then linearly from the linear actuators to the second plate structure and from the second plate structure to the surface; and wherein the second plate structure and the at least three second connecting structures are configured to minimize the bending moment exerted on the second plate from the payload weight when the second plate structure is placed on the surface.

2. The powered leveling base of claim 1, wherein:
each electrically powered linear actuator comprises a jackscrew.

3. The powered leveling base of claim 2, wherein:
each rod operably engages a drive member that is operably connected to an output shaft of an electric motor such that actuation of the electric motor causes the rod to shift linearly relative to the housing of the jackscrew; and
each respective electric motor is disposed within its respective housing in a portion of the respective housing that extends at least partially into the surface.

4. The powered leveling base of claim 3, wherein:
each rod includes at least one helical external gear; and
each drive member comprises a driving shaft having at least one internal gear that operably engages the at least one helical external gear of each associated rod, each driving shaft disposed within its respective housing, whereby rotation of the driving shaft relative to the associated rod causes the rod to shift linearly relative to the respective housing.

5. The powered leveling base of claim 4, wherein:
each jackscrew includes a gear assembly operably interconnecting the electric motor to the driving shaft.

6. The powered leveling base of claim 3, wherein:
each electric motor comprises one of a servo motor or a stepper motor.

7. The powered leveling base of claim 1, wherein:
at least one of the first connecting structure comprises a clevis extending radially outward from the center of the first plate structure;
each swivel joint comprises a ball joint having a bushing with an opening and a spherical convex outer surface that slidably engages a concave spherical surface in an end of each rod, and a pin extending through openings in each clevis and through the opening of the bushing.

8. The powered leveling base of claim 7, wherein:
at least one of the second connecting structures comprises a clevis extending radially outward from the center of the second plate structure;
each rotational joint comprises a pair of bosses extending outwardly from each housing in opposite directions and rotationally engaging a clevis.

9. The powered leveling base of claim 1, wherein:
the first connecting structures are disposed at 120° angles relative to one another at equal distances from the center of the first plate structure;
the second connecting structures are disposed at 120° angles relative to one another at equal distances from the center of the second plate structure.

10. An adjustable base for positioning a payload structure relative to a surface, the adjustable base comprising:
a first structure adapted for receiving a payload structure, the first structure having at least three first connecting structures that are radially spaced apart about a center of the first structure;
a second structure adapted for placement on a surface, the second structure having at least three second connecting structures that are radially spaced apart about a center of the second structure, the first structure and the second structure disposed in an opposing relationship, the second structure having a first portion and a second portion opposite the first portion;
wherein at least one of the at least three first connecting structures corresponds to at least one of the at least three second connecting structures so as to form a pair of corresponding connecting structures disposed in opposing relationship;
at least three legs operably interconnecting the first structure to the second structure;

wherein at least two of the legs comprise electrically powered linear actuators, each having an actuator housing and a rod that extends and retracts linearly relative to the housing when the linear actuator is actuated, the rod defining a rod end of the linear actuator and the housing defining a housing end of the linear actuator, wherein each linear actuator is configured such that the rod does not extend or retract relative to the actuator housing in response to a force applied to the rod;

wherein each linear actuator is partially interposed between the first structure and the second structure so that the rod end is proximate to one plate structure and the housing end is proximate to the other plate structure, wherein the linear actuator operably connects with one pair of corresponding connecting structures;

wherein each rod end is configured to connect to the first structure to form a swivel joint permitting rotation relative to the rod about exactly two axes, and wherein each housing end is configured to connect to the second structure to form a rotational joint permitting rotation relative to the housing about exactly one axis and each housing extends through its respective connected rotational joint such that the housing extends from the first portion of the second structure and past the second portion of the second structure;

wherein each linear actuator can be independently actuated to thereby change at least one of an angular position and a distance of the first structure relative to the second structure, and wherein all linear actuators can be actuated simultaneously whereby the rods of all linear actuators extend simultaneously or retract simultaneously to cause the first plate structure to translate linearly relative to the second plate structure;

wherein the base is configured such that when the second structure is placed on the surface and the payload structure having a payload weight is placed on the first structure, the second portion of the second structure at least partially contacts the surface and each housing extends at least partially into the surface, the payload structure may be moved to a desired position by actuation of one or more of the linear actuators, and the payload weight is transferred from the first structure to the at least three legs, and then linearly from the at least three legs to the second structure and from the second structure to the surface; and wherein the second structure and the at least three legs are configured to minimize the bending moment exerted on the second structure from the payload weight when the second structure is placed on the surface.

11. The adjustable base of claim 10, wherein:
at least one of the legs comprises a rigid link that cannot be extended or retracted, and wherein the rigid link is connected to selected ones of the first and second connecting structures such that a distance between the selected ones of the first and second connecting structures cannot be adjusted.

12. The adjustable base of claim 10, wherein:
the adjustable base includes at least four legs operably interconnecting the first structure to the second structure.

13. The adjustable base of claim 12, wherein:
at least two of the legs comprise non-extendable rigid links interconnecting the first and second structures such that the first structure cannot translate linearly relative to the second structure along the lengths of the non-extendable rigid links.

14. The adjustable base of claim 12, wherein:
at least two of the legs are back drivable and include a brake to selectively prevent extension and/or retraction of the leg.

15. The adjustable base of claim 10, wherein:
the adjustable base includes at least six legs operably interconnecting the first structure to the second structure.

16. The adjustable base of claim 15, wherein:
at least three of the legs comprise electrically powered linear actuators that are not back drivable.

17. The adjustable base of claim 16, wherein:
at least three of the legs are back drivable, and include a brake that can be actuated to selectively prevent extension and/or retraction.

18. A powered leveling base for positioning a payload structure relative to a surface, the powered leveling base comprising:
a first structure adapted for receiving a payload structure, the first structure having at least three first connecting structures that are radially spaced apart about a center of the first structure;

a second structure adapted for placement on a surface, the second structure having at least three second connecting structures that are radially spaced apart about a center of the second structure, the first structure and the second structure disposed in an opposing relationship, the second structure having a first portion and a second portion opposite the first portion;

wherein at least one of the at least three first connecting structures corresponds to at least one of the at least three second connecting structures so as to form a pair of corresponding connecting structures disposed in opposing relationship;

at least three electrically powered linear actuators, each having an actuator housing and a rod associated with the housing, the rod defining a rod end of the linear actuator and the housing defining a housing end of the linear actuator, wherein each rod extends and retracts linearly relative to the respective housing when the linear actuator is actuated, wherein each linear actuator is configured such that it cannot be back driven, and each linear actuator includes a drive member at least partially disposed within its respective housing;

wherein each linear actuator is partially interposed between the first structure and the second structure so that the rod end is proximate to one structure and the housing end is proximate to the other plate structure, wherein the linear actuator operably connects with one pair of corresponding connecting structures;

wherein each rod end is configured to connect to one of the at least three first connecting structures to form a swivel joint permitting rotation relative to the rod about exactly two axes;

wherein each housing end is configured to connect to one of the at least three second connecting structures to form a rotational joint permitting rotation relative to the housing about exactly one axis and each housing extends through its respective connected one of the at least three second connecting structures such that the housing extends from the first portion of the second structure and past the second portion of the second structure;

wherein each linear actuator can be independently actuated to thereby change at least one of an angular position and a distance of the first structure relative to the second structure, and wherein all linear actuators can be actuated simultaneously whereby the rods of all linear actuators extend simultaneously or retract simultaneously to cause the first plate structure to translate linearly relative to the second plate structure;

wherein the base is configured such that when the second structure is placed on the surface and the payload structure having a payload weight is placed on the first structure, the second portion of the second structure at least partially contacts the surface and each housing extends at least partially into the surface, the payload structure may be moved to a desired position by actuation of one or more of the linear actuators, and the payload weight is transferred from the first structure to the linear actuators, and then linearly from the linear actuators to the second structure and from the second structure to the surface;

wherein the second structure and the three second connecting structures are configured to minimize the bending moment exerted on the second structure from the payload weight when the second structure is placed on the surface; and wherein each respective drive member at least partially is encased in the respective housing portion that extends at least partially into the surface.

19. The powered leveling base of claim 18, wherein:

at least one of the first connecting structure comprises a clevis extending radially outward from the center of the first plate structure;

each swivel joint comprises a ball joint having a bushing with an opening and a spherical convex outer surface that slidably engages a concave spherical surface in an end of each rod, and a pin extending through openings in each clevis and through the opening of the bushing;

at least one of the second connecting structure comprises a clevis extending radially outward from the center of the second plate structure; and each rotational joint comprises a pair of bosses extending outwardly from each housing in opposite directions and rotationally engaging a clevis.

20. The powered leveling base of claim 18, further comprising:

a controller in communication with a position sensor to sense the orientation of the payload structure, the controller configured to operate automatically to place the payload structure and first structure in a predetermined orientation relative to the second structure.

* * * * *